United States Patent [19]
Pinault et al.

[11] Patent Number: 5,878,341
[45] Date of Patent: Mar. 2, 1999

[54] DEVICE FOR AUTHORIZING THE SELECTION OF A CELL IN A TERMINAL OF A CELLULAR MOBILE RADIO NETWORK IN THE STANDBY STATE

[75] Inventors: Francis Pinault, Bois Colombes; Christophe Jouin, Paris, both of France

[73] Assignee: Alcatel Mobile Phones, Paris, France

[21] Appl. No.: 623,148

[22] Filed: Mar. 28, 1996

[30] Foreign Application Priority Data

Mar. 29, 1995 [FR] France .................................. 95 03705

[51] Int. Cl.⁶ .............................. H04Q 7/28; H04Q 7/32; H04Q 7/36
[52] U.S. Cl. .......................... 455/422; 455/450; 455/464; 455/161.3
[58] Field of Search ..................... 455/422, 450, 455/439, 458, 434, 403, 444, 509, 67.1, 464, 429, 443, 446, 62, 161.3

[56] References Cited

U.S. PATENT DOCUMENTS

| | | | |
|---|---|---|---|
| 5,345,597 | 9/1994 | Strawczynski | 455/450 |
| 5,357,561 | 10/1994 | Grube. | |
| 5,418,839 | 5/1995 | Knuth et al. | 455/464 |
| 5,422,933 | 6/1995 | Barnett et al. | 455/439 |
| 5,491,717 | 2/1996 | Hall | 455/67.1 |
| 5,491,837 | 2/1996 | Haartsen | 455/450 |
| 5,548,808 | 8/1996 | Bruckert et al. | 455/442 |
| 5,594,776 | 1/1997 | Dent | 455/458 |

FOREIGN PATENT DOCUMENTS

WO 94/13069  6/1994  WIPO.
WO 94/26055  11/1994  WIPO.

*Primary Examiner*—Wellington Chin
*Assistant Examiner*—Keith Ferguson
*Attorney, Agent, or Firm*—Sughrue, Mion Zinn, Macpeak & Seas, PLLC

[57] ABSTRACT

To authorize the selection of a cell in a cellular mobile radio network terminal in the standby state, a parameter is calculated representative of the transmission quality with reference to that cell. If the parameter has a sufficient value relative to a cell selection threshold, setting up of a call involving said terminal is authorized in relation to that cell. If the parameter does not have a sufficient value relative to the cell selection threshold, but has a sufficient value relative to a cell deselection threshold, less than the cell selection threshold, some or possibly all of the functions relating to setting up of a call involving said terminal are authorized in relation to that cell.

5 Claims, 1 Drawing Sheet

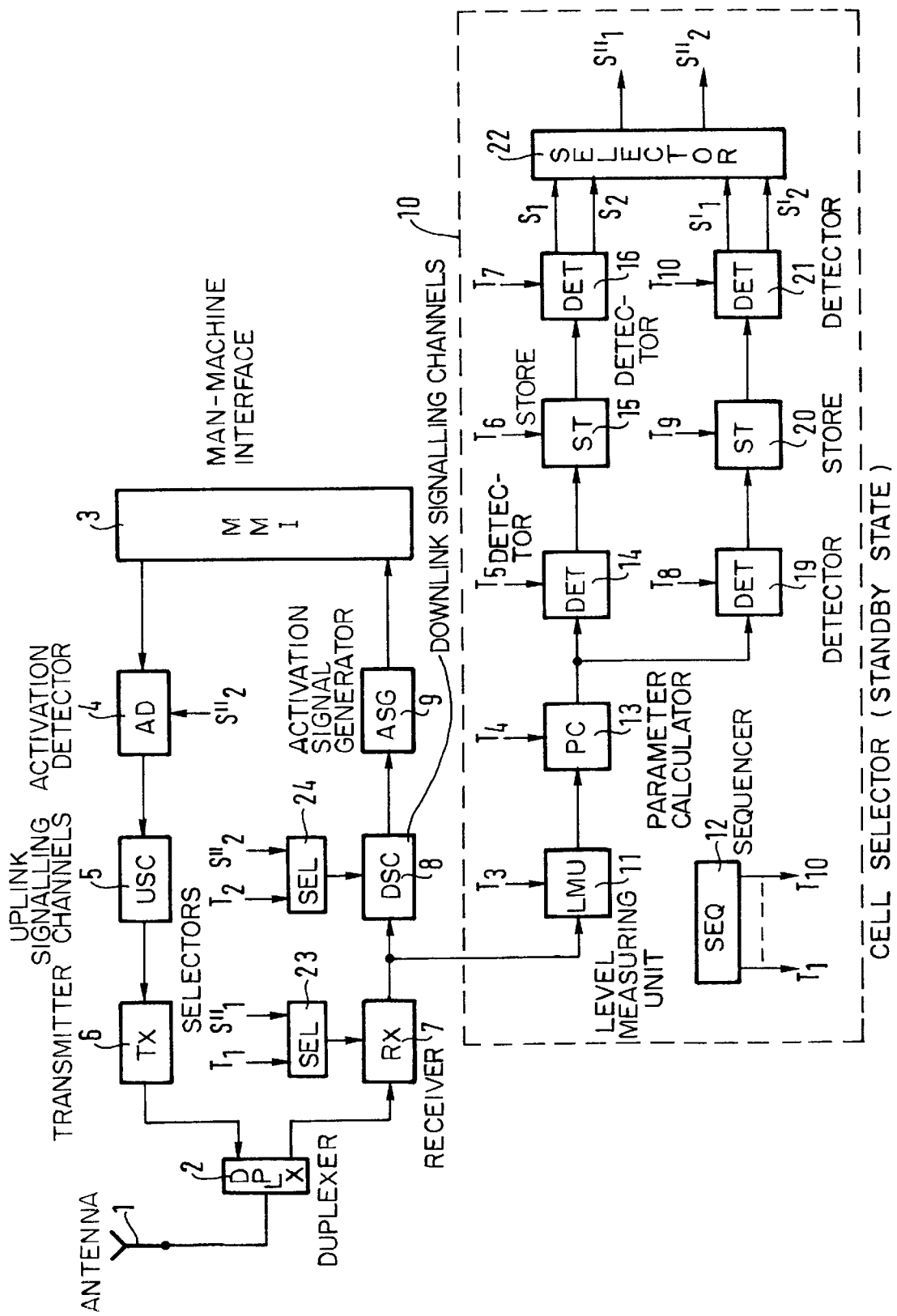

DEVICE FOR AUTHORIZING THE SELECTION OF A CELL IN A TERMINAL OF A CELLULAR MOBILE RADIO NETWORK IN THE STANDBY STATE

BACKGROUND OF THE INVENTION

1. Field of the Invention

The invention is generally concerned with mobile radio networks.

The present invention is more particularly concerned with a terminal for a cellular mobile radio network, such as the GSM network in particular, and even more particularly with a device for authorizing the selection of a cell in a terminal of this kind in the standby state.

2. Description of the Prior Art

To be able to receive calls in the standby state, a terminal of this kind must execute a number of functions, such as listening out for "paging" messages in particular. These messages are broadcast in each cell on a broadcast control channel characteristic of the cell.

The terminal continuously selects the optimum cell, i.e. that for which transmission quality is the highest, to listen to these paging messages.

A parameter representative of the transmission quality is therefore defined, allowing in particular for the signal level as received by the terminal in a cell on the broadcast control channel of that cell, to which end the broadcast control channel is broadcast continuously in that cell.

This parameter, known as "C1" in the case of the GSM system, for example, is described in more detail on pages 453 through 455 of "The GSM System for Mobile Communications" by Michel MOULY and Marie-Bernadette PAUTET (Europe Media Duplication—1992).

Briefly, in the GSM system, to select a cell the terminal calculates the parameter $C_1$ for each of the various cells surrounding it, eliminates those cells for which the value of $C_1$ obtained is below a given cell selection threshold, selected to guarantee a guaranteed grade of service to the user once a call involving the terminal has been set up in the cell selected in this manner, and retains whichever of the cells obtained in this way yields the highest value $C_1$.

If no value of $C_1$ above the cell selection threshold can be found, because receive levels are too low, no cell can be selected and the terminal is unable to access the network to set up calls.

An essential aim of the present invention is to reduce the number of situations in which a terminal is prevented in this way from accessing the network, because no cell can be selected, or in other words, to enlarge to some degree the coverage area of the network.

SUMMARY OF THE INVENTION

Accordingly, the present invention consists in a device for authorizing the selection of a cell in a cellular mobile radio network terminal in the standby state, including means for calculating a parameter representative of the transmission quality with reference to said cell, means for determining if said parameter has a sufficient value relative to a cell selection threshold, and if it has to authorize, in relation to said cell, setting up of a call involving said terminal, and means for determining, if said parameter does not have a sufficient value relative to said cell selection threshold, if it has a sufficient value relative to a cell deselection threshold, less than the cell selection threshold, and if it has, to authorize, in relation to said cell, some or possibly all of the functions relating to setting up of a call involving said terminal.

According to another feature of the invention, the device further includes means for comparing the various parameters obtained in this way which have a sufficient value relative to said cell deselection threshold in order to determine the best of said cells, relative to which some or even all of said functions relating to the setting up of a call involving said terminal will be authorized.

According to another feature of the invention, said part of the functions relating to call set-up is that part enabling production of a paging signal in the case of an incoming call relevant to said terminal.

According to another feature of the invention, said part of the functions relating to call set-up is that part enabling listing to common channels, including short messages, broadcast on a broadcast control channel characteristic of said cell.

According to another feature of the invention, the device further includes means commanding the production of a signal intended to alert the user to the risk of non-optimal grade of service when some or even all of the functions relating to the setting up of a call involving said terminal are authorized in this way.

The present invention applies in particular to terminals which, when they change from the standby state to a communication state or at some other time, change from a degraded mode of operation, in which receive levels are too low to authorize the selection of a cell on the basis of the cell selection threshold, to a non-degraded mode of operation in which the receive levels are sufficient to authorize cell selection. One example of the degraded mode is that of a portable terminal in the standby state, in the pocket of the user, with its antenna stowed. One example of the non-degraded mode is that of the same terminal held in the hand with its antenna deployed.

Accordingly, in this application example the present invention, unlike the prior art as outlined above, can authorize the production of a paging signal in the case of an incoming call addressed to the terminal when the latter is in the degraded mode. Alerted by this paging signal, the user can then take the terminal out of their pocket, deploy the antenna and, the non-degraded mode then being operative, take the call in the normal manner.

Another example of the degraded mode is that of a terminal temporarily encountering unfavorable radio signal propagation conditions as the user moves around.

Other objects and features of the present invention will emerge from a reading of the following description of one embodiment given with reference to the appended drawing.

BRIEF DESCRIPTION OF THE DRAWING

The single figure in the appended drawing is a block schematic of one embodiment of a device in accordance with the invention and the components of a mobile radio network terminal necessary to its operation.

DETAILED DESCRIPTION OF THE PREFERRED EMBODIMENT

The schematic shows, in a manner that is known in itself, between an antenna 1 and a duplexer 2, on the one hand, and a man-machine interface means 3 of the terminal, on the other hand:

an uplink channel including:

means 4 for detecting activation of certain units of the man-machine interface, such as the keypad of the terminal in particular, and producing corresponding messages, means 5 for producing, on the basis of the aforementioned messages, common or dedicated uplink signaling channels, a transmitter 6, a downlink channel including:

a receiver 7, downlink common or dedicated signaling channel listening means 8, means 9 for producing corresponding signals, necessary for activation of certain units of the manmachine dialogue means, such as a buzzer, a screen, etc.

The schematic also shows means 10 for cell selection in the standby state.

In a manner known in itself, the means 10 for cell selection in the standby state include:

means 11 for measuring the level of the output signals from the receiver 7, for a given tuned frequency of the receiving means, corresponding to the broadcast control channel of one of the various surrounding cells, the broadcast control channel in question being indicated by a control signal $T_1$ applied to the corresponding control input of the receiver 7 and obtained from a sequencer 12 sequencing the operations of cell selection in the standby state, means 13 for calculating a parameter $C_1$ representative of transmission quality in relation to the cell for which a level is measured as above by the means 11, means 14 for detecting if the value of the parameter calculated in this way is above a cell selection threshold, means 15 for storing the value $C_1$ above the cell selection threshold detected in this way, means 16 for detecting the greatest of the values stored in this way.

The cell selection threshold is selected to guarantee a given grade of service $Q_1$ to the user when a call involving the terminal is set up in the cell selected in this way by means 16.

The means 16 supply a first control signal $S_1$ which commands tuning of the local frequency of the receiver 7 to the broadcast control channel of the cell selected by the means 16. The means 16 also supply a second control signal $S_2$ commanding the means 8 to listen to common channels, including paging channels, broadcast on the broadcast control channel of the cell selected by the means 16.

In accordance with the invention, the means 10 for cell selection in the standby state further include:

means 19 for detecting if the magnitude $C_1$ calculated by the means 13 is above a cell deselection threshold lower than the cell selection threshold, means 20 for storing the values greater than the cell deselection threshold detected in this way, means 21 for detecting the greatest of the values stored in this way.

The cell deselection threshold is detected to guarantee a grade of service $Q_2$ which in this instance is below the grade of service $Q_1$.

The means 21 supply a first control signal $S'_1$ commanding tuning of the local frequency of the receiver 7 to the broadcast control channel of the cell selected by the means 12.

The means 21 further supply a second control signal $S'_2$ commanding the means 8 to listen to common channels, including paging channels, broadcast on the broadcast control channel of the cell selected by the means 21.

The signals $S_1$, $S_2$, $S'_1$ and $S'_2$ are applied to a circuit 22 supplying signals $S''_1$ and $S''_2$ respectively equal to the signals $S_1$ and $S_2$ when the latter signals indicate that a cell can be selected on the basis of the cell selection threshold or to the signals $S'_1$ and $S'_2$ when the latter signals indicate that no cell can be selected on the basis of the cell selection threshold.

If no cell can be selected, either on the basis of the cell selection threshold or on the basis of the cell deselection threshold, the signals $S''_1$ and $S''_2$ isolate the receiver 7 and the means 8 listening to common channels including paging channels.

The cell selection process as described above is repeated continuously (possibly in parallel with listening to paging channels broadcast on the broadcast control channel of the selected cell) by means of commands issued by the sequencer 12. Like the means 7, the means 8, 11, 13, 14, 15, 16, 19, 20 and 21 are therefore controlled by respective control signals $T_2$ through $T_{10}$ issued by the sequencer 12.

The signal $T_1$ or $S''_1$ applied to the receiver 7 is selected by a circuit 23 and the signal $T_2$ or $S''_2$ applied to the means 8 for listening to the common channels is selected by a circuit 24.

In this embodiment, one of the signals from the circuit 22, for example the signal $S''_2$, is fed to a control input of the means 4 for detecting activation of the man-machine interface and producing corresponding messages. In this instance, this command disables the production of the messages usually produced by the means 4 on detection of call acceptance by the user. The production of a message of this kind is authorized if a cell can be selected on the basis of the cell selection threshold or prohibited if no cell can be selected on the basis of the cell selection threshold but a cell can be selected on the basis of the cell deselection threshold.

This embodiment corresponds in particular to the application example mentioned above, i.e. to the situation in which, alerted by a paging signal, the user changes the terminal from a degraded mode of operation to a non-degraded mode of operation, for example by removing it from their pocket and deploying the antenna.

As the selection process is repeated continuously, a cell can then be found on the basis of the cell selection threshold and the call can then take place in the normal manner, i.e. with the grade of service $Q_1$.

The above example therefore corresponds in particular to the situation in which said part of the functions relating to call set-up is that enabling the production of an incoming paging signal.

Other examples are nevertheless feasible; for example, said part of the functions relating to call setup could consist in the listening to common channels, in particular short messages, broadcast on the broadcast control channel of the cell in question.

In none of the feasible application examples is there is anything to prevent authorization of all of said options, even if this entails the risk of a non-optimal grade of service.

In this case a signal could be generated to alert the user to the risk of non-optimal grade of service, for example a message on the screen of the terminal.

In the example given above this could be achieved by applying one of the signals from the circuit 22, for example the signal $S'_2$, to the means 9 commanding activation of the man-machine interface.

There is claimed:

1. A device for authorizing the selection of a cell in a cellular mobile radio network terminal in the standby state, including;

means for calculating a parameter representative of the transmission quality with reference to said cell, means for normal call setup for said terminal in said cell when said parameter is greater than a cell selection threshold, and means for authorizing only some call setup functions of said terminal in said cell when said parameter is less than said cell selection threshold and is greater than a cell deselection threshold, said call deselection threshold being less than the cell selection threshold.

2. The device according to claim 1 further including means for comparing the various parameters obtained in this way which have a sufficient value relative to said cell deselection threshold in order to determine the best of said cells, relative to which some or even all of said functions relating to the setting up of a call involving said terminal will be authorized.

3. The device according to claim 1 wherein said only some call setup functions comprises enabling production of a paging signal in response to detection of an incoming call relevant to said terminal.

4. The device according to claim 1 wherein said only some call setup functions comprises enabling listening to common channels broadcast on a broadcast control channel characteristic of said cell.

5. The device according to claim 1 further including means commanding the production of a signal to alert the user to the risk of a non-optimal grade of service when said only some call setup functions are authorized.

* * * * *